April 11, 1950     J. A. YOUNGBLOOD     2,503,537
SAW-PROOF GRATING BAR
Filed Aug. 9, 1947
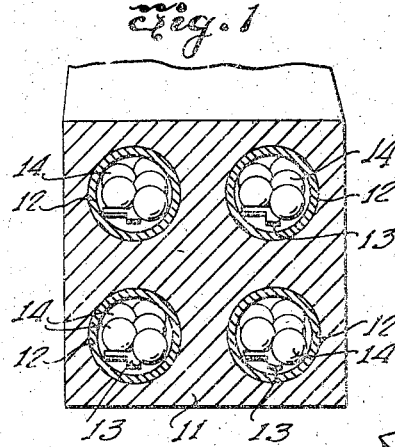
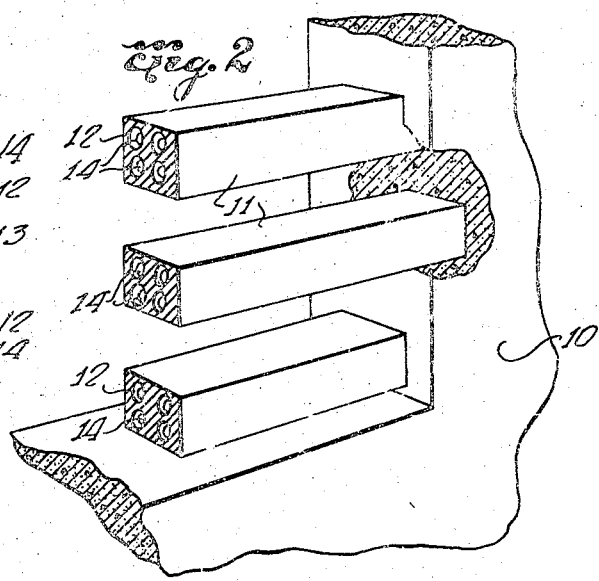
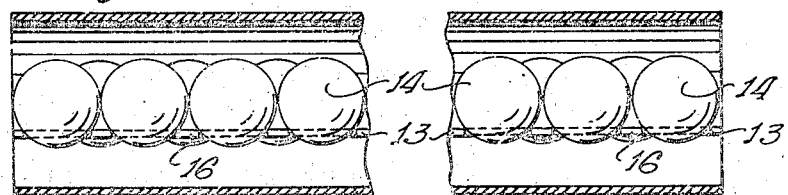
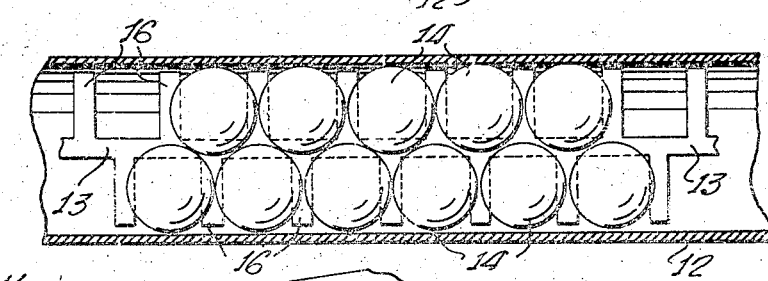
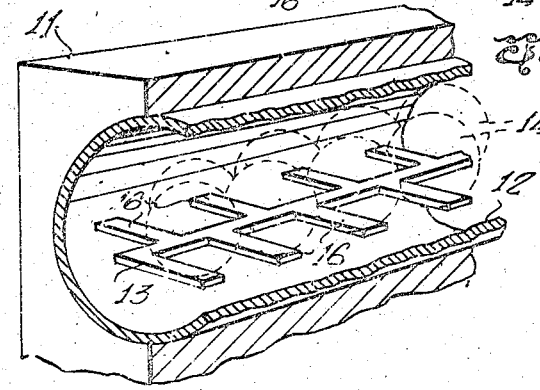
JAMES A. YOUNGBLOOD
INVENTOR.
ATTORNEY Patented Apr. 11, 1950

2,503,537

UNITED STATES PATENT OFFICE 2,503,537

SAWPROOF GRATING BAR

James A. Youngblood, Dallas, Tex.

Application August 9, 1947, Serial No. 767,821

4 Claims. (Cl. 109—81)

This invention relates to saw resisting grating bars and more particularly to bars adapted to cover prison or cell openings, bank or vault windows and the like which will defeat efforts to saw through them.

The principal object of the invention is to provide a protective bar of the type set forth which consists of an elongated, cast metal body of any desired cross-sectional shape having one or more cores, each comprised of a hollow and preferably cylindrical shape containing a plurality of spherical bodies of hard substance such as agate and having polished surfaces. Preferably two rows of these spherical bodies are provided in parallelism, the bodies being in staggered relationship and their degree of relative displacement is predetermined to preclude positional interchange from one row to the other. Efforts to sever the bar as a whole as with a hack saw will be defeated, due to the tendency of the individual spherical bodies to roll or revolve with the motion of the saw.

Another object of the invention is to provide a saw-proof bar which is permanently effective for the purpose described because of the corrosion and rust resisting characteristics of the material of which the spherical bodies are made, thus preventing said spherical bodies from sticking by erosion in a fixed position.

Another object of the invention is to provide the spherical bodies in disconnected units so that each of said units would turn individually with ease in its respective orbit when contacted with saw or file.

Still another object of the invention is to provide means in the tubular cores of the bar to retain the spherical bodies in predeterminately spaced relationship.

With the foregoing objects in view, the invention has further reference to certain features of accomplishment which will become apparent as the description proceeds, taken in connection with the accompanying drawing wherein:

Figure 1 is a fragmentary perspective view of a typical bar, partly in section.

Figure 2 is a fragmentary perspective view of a grating, showing bars constructed according to the present invention.

Figure 3 is a longitudinal sectional view of a tubular core, broken intermediate its ends to denote extension.

Figure 4 is a fragmentary view of a core in longitudinal section, rotated 90° from the showing in Figure 3, and Figure 5 is a fragmentary sectional view of a bar showing the ball rack on which the balls are shown in dotted lines.

Protective grating or prison bars of various kinds and types have been heretofore devised with a view to defeating the action of a saw but these, for the most part are only partially effective since they consist of parts of continuous elongated units composed of materials vulnerable to the sticking and stiffening effects of rust and corrosion and since their effectiveness resides in their ability to yield in motion under the action of a saw, their fixation, due to rusting or corrosion, renders them ineffective to defeat the action of a saw.

Continuing with a more detailed description of the drawing, reference numeral 10 denotes a window or other opening protected by a grating consisting of bars 11 of identical construction. It is preferred that while the bars may be collectively mounted in steel frames, they be anchored, as shown, in the concrete or masonry opening of the window.

Each of the bars 11 consists of an elongated cast iron body of any desired shape in transverse section. The bar has one or more cores containing a metal tube 12, preferably of cylindrical shape. In fabricating the bars, the tubular cores are approximately arranged vertically in a mold form and molten metal is poured into the mold form around the cores which latter are co-axial with the resultant body.

In each core tube 12 there is affixed, by spot-welding at its ends, a rack or partition 13 which extends the full length of the tube. On this rack or partition rests two rows of relatively staggered spherical bodies 14. These spherical bodies are formed preferably from a hard rust resisting mineral such as agate or glass and their surfaces are highly polished thus minimizing the friction of the surfaces of said spherical bodies so as to permit each individual body or ball to revolve, should it be engaged by a saw for severing the body 11 and tubular core 12.

The rack 13, for the purpose of illustrating a suitable support for the balls or marbles 14, and fixing their relative position, is shown as consisting of a metal stamping defining a central rib, from the sides of which extend in staggered relationship a plurality of fingers 15, the ends of the latter resting on the walls of the core member 12 and to which certain of the fingers may be attached by any practical means, such as spot-welding, to hold the rack securely in place. The position of the rack in the tube 12 is such that the centers of the balls 14 will be disposed at or slightly above the longitudinal axis of the tube, thus preventing any of the spherical bodies 14 from being raised out of recess in rack 13.

The fingers 16 define individual recesses for the balls 14 in which they may have limited displacement but not such as to permit a saw blade to cut diagonally through the bar and displace both the ball first engaged thereby and the ball next adjacent thereto in the companion row.

The spherical bodies or agate marbles 14 of each row are loosely arranged in the recesses between the fingers 16 of the rack, as stated, to permit of individual revolving movement thereby preventing their relative displacement. Hence it is impossible for the balls of one row to exchange places with or become aligned with those of the companion row, thus insuring that at least one ball will offer an obstruction to a saw which has succeeded in penetrating the body 11 and core tube 12 and, in being free to rotate in any direction, the ball will defeat any further cutting of the saw. There is further the assurance that the protection thus afforded will be long lasting and even after long periods of time it will serve equally as well for the purpose intended, due to the non-corrosive nature of the balls 14.

Manifestly, the construction as shown and described is capable of some modification and such modification as may be construed to fall within the scope and meaning of the appended claims is also considered to be within the spirit and intent of the invention.

What is claimed is:

1. A saw resisting element including an elongated solid metal bar having longitudinally coextensive and cylindrical passages, a plurality of rows of hard spherical bodies in staggered relationship in each of said passages and means coextensive with each of said passages having staggered rows of parallel recesses receiving said spherical bodies and for restricting geometrical displacement of said spherical bodies but ineffective to prohibit unlimited rotative movement thereof.

2. A bar of the character described comprising a solid metallic body cast about a series of tubular cores, a coextensive partition in each of said cores consisting of a metal rack whose width is less than the inner diameter of said core and provided with parallel rows of staggered recesses, a spherical body of hard material retained in each recess of said rack and held thereby against other than unlimited rotative movement.

3. A bar for protective gratings including a solid metallic body cast about a tubular core, a plurality of spherical bodies of rust resisting substance in said core, and a rack defining a partition coextensive with said core and having parallel rows of staggered recesses to retain said spherical bodies.

4. A bar for protective gratings, comprising a solid metallic body cast about a tubular core, a plurality of spherical bodies of rust resisting substance in said core and a rack defining a partition substantially less in width than the internal diameter of said core and having parallel rows of staggered recesses receiving said spherical bodies to limit displacement of the spherical bodies collectively in the tubular core to a distance less than the diameter of a single spherical body.

JAMES A. YOUNGBLOOD.

REFERENCES CITED

The following references are of record in the file of this patent:

UNITED STATES PATENTS

| Number | Name | Date |
|---|---|---|
| 40,947 | Rogers | Dec. 15, 1863 |
| 881,031 | Schultz | Mar. 3, 1908 |
| 1,463,498 | Burgess | July 31, 1923 |
| 2,156,579 | Bayon | May 2, 1939 |